United States Patent Office.

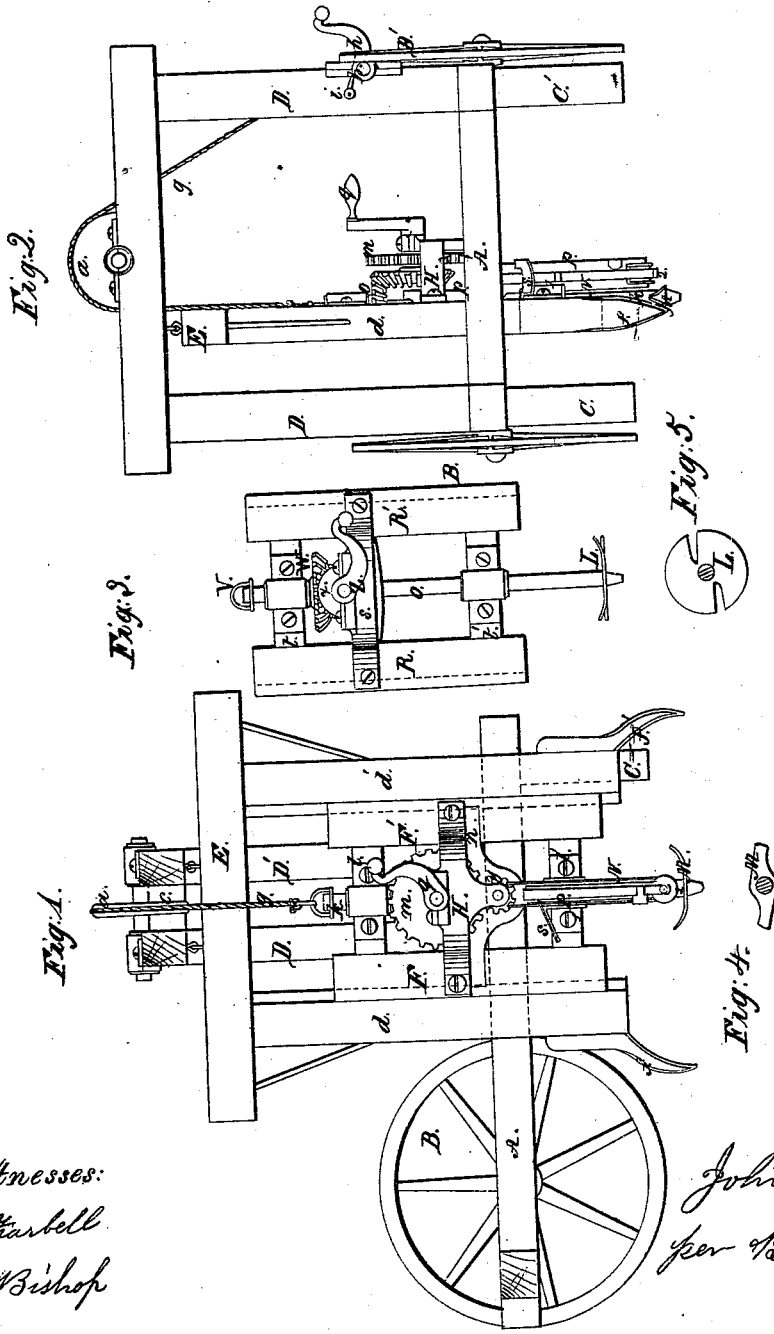

JOHN COTHRON, OF ILLIOPOLIS, ILLINOIS, ASSIGNOR TO HIMSELF AND D. J. MAYES, OF SAME PLACE.

Letters Patent No. 82,293, dated September 22, 1868.

POST-HOLE BORER.

*The Schedule referred to in these Letters Patent and making part of the same.*

TO ALL WHOM IT MAY CONCERN:

Be it known that I, JOHN COTHRON, of Illiopolis, in the county of Sangamon, and State of Illinois, have invented a new and useful Improved Post-Hole Borer, of which the following is a full, clear, and exact description, reference being had to the annexed drawing, making a part of this specification, in which—

Figure 1 represents a longitudinal sectional elevation of my invention.

Figure 2 represents a transverse sectional elevation of same.

Figure 3 represents a detached side view of one of the borers.

Figure 4 represents a top view of the knife shown in figs. 1, 2.

Figure 5 represents a top view of the knife shown in fig. 3.

Similar letters indicate like parts.

My invention contemplates a machine provided with a double set of borers, so that it may be used equally well in wet or dry ground.

It consists of a square frame, A, figs. 1, 2, mounted on wheels at one end, seen at B B', fig. 2, B, fig. 1, and resting on legs C C', fig. 2, C, fig. 1, at the other. On this are raised two frames, D D', fig. 1, D, fig. 2, the cross-pieces of which form bearings for the wheel $a$, figs. 1, 2, working between them, and the uprights afford bearings for the windlass $b$, fig. 2.

To the bar $c$, fig. 1, connecting the cross-pieces, is hung by links, as shown, the frame E, figs. 1, 2, consisting of two uprights, $d\ d'$, fig. 1, $d$, fig. 2, and a cross-piece, as shown. The frame is so hung as to swing freely on its fastenings, and the uprights are made to nearly reach the ground, so that the iron points $f\ f'$, fig. 1, $f$, fig. 2, attached to them, may, by raising the frame A, and letting it drop, be made to enter the ground a sufficient distance to keep the frame E steady.

A frame, whose sides, F F', fig. 1, are grooved, to correspond with the tonguing of the uprights $d\ d'$, works freely up and down in the frame E, by means of the rope $g$, figs. 1, 2, passing over the wheel $a$, and connected with the windlass $b$, as shown, the motion of the windlass being regulated by the crank, $h$, and pawl $i$, fig. 2.

A vertical shaft, $k$, figs. 1, 2, is attached by suitable bearings to the cross-pieces $l\ l'$, fig. 1, connecting F F', and has upon its head a swivel-ring, which connects with the hook on the rope $g$, as shown in figs. 1, 2, while below the cross-piece $l$ is fixed on the shaft a bevel-gear, $o$, fig. 2, engaging with the bevel-gear $p$, fig. 2, attached to a shaft having on it a spur-gear, $m$, figs. 1, 2, the bearings of this shaft being in H, figs. 1, 2, and the cross-pieces $n$, fig. 1, connecting F F', both H and $n$ being extended, so as to form bearings for the shaft of the spur-gear $r$, fig. 2, gearing with $m$, the whole gearing being set in motion by the crank, $q$, figs. 1, 2.

To the lower extremity of P, figs. 1, 2, extending from the cross-piece $l'$, is fixed a wheel, around which and the shaft of the spur-gear $r$ passes a belt, N, provided with a number of buckets, 1, 2, &c., figs. 1, 2, similar to those in common use for elevators. Near the top of P is fixed a "chute," $s$, figs. 1, 2.

On the lower end of the shaft $k$ is a curved knife, M, figs. 1, 2, a top view of which is seen in fig. 4, the shaft $k$, which terminates in a point, extending a little below the knife. This apparatus is to be used in dry ground.

The frame E having been made firm at the place where the hole is to be dug, in the manner described above, the operator, standing between the wheels, and turning the crank, $q$, the point of the shaft $k$ enters the ground, and then, the knife following, loosens and crumbles the earth, so that the buckets, 1, 2, &c., at each revolution, taking it up, carry it; and, as they pass over the shaft on which they revolve, empty it on to the chute $s$, which prevents it from falling back into the hole. As the hole deepens, the borer, by its own weight, gradually follows, the operator, by means of the crank, $h$, having complete control over its descent. When the hole is deep enough, the borer is raised by the windlass, and the pawl preventing its falling again, the operator, placing a hand on each side of the frame A, raises one end of it, and wheels the machine to the next point where a hole is to be dug, and there, the frame having been made firm, the same operations are repeated, the holes requiring no "finishing" after the machine has left them.

As it is frequently desired to dig post-holes in marshy and wet ground, I have a borer especially adapted to such, which I insert in the place of the one described. On a framework, composed of uprights R R', fig. 3, and cross-pieces t t', of the same size and construction as the one already described, a vertical shaft, O, similar to k, likewise having a swivel-ring, v, and a bevel-gear, w, is attached in the same way as k is to its frame. The gear w gears with the bevel-gear x, attached to a shaft having its bearings in S, and a cross-piece connecting R R'. To the shaft is attached a crank, z. Near the end of the shaft, which terminates in a point, is a double-bladed circular knife, L, of which a top view is seen in fig. 5. The other borer being removed from the frame E, and this inserted in its stead, the machine is then ready for boring in wet ground, the earth, as it is cut, being removed from the hole in any convenient way, and the operation of the borer regulated and directed in the manner already described.

The advantages of this machine are, that by it post-holes may be dug in either wet or dry ground, with less labor, greater rapidity, and much more perfectly, than by other machines; and since it may be operated by one man, it is much less expensive than most methods of digging post-holes, as, disposing of its own earth, and leaving the hole in a finished condition, when the earth is dry, one man can do the work of many, and even when the ground is wet it greatly lessens the labor of digging; besides, by being adjustable, it is perfectly adapted to holes of any desired depth.

I do not claim that the knives used are new, nor that there is any novelty in digging post-holes by means of knives attached to shafting, driven by suitable gearing; but What I do claim as my invention, and desire to secure by Letters Patent, is—

The shaft k, knife M, belt N, with its buckets, gears o m p, and their shafts, and frame to which they are attached, wheel a, windlass b, with its connecting-rope g, frames E and A of a post-hole borer, all constructed, arranged, and operated substantially as and for the purpose specified.

JOHN COTHRON.

Witnesses:
J. M. WISE,
WILLIAM HEY.